(12) United States Patent
Stone

(10) Patent No.: US 8,041,640 B2
(45) Date of Patent: Oct. 18, 2011

(54) METHOD AND SYSTEM FOR ACCOUNT VERIFICATION

(75) Inventor: Brian Stone, Alpharetta, GA (US)

(73) Assignee: Compucredit Intellectual Property Holdings Corp. II, Las Vegas, NV (US)

(*) Notice: Subject to any disclaimer, the term of this patent is extended or adjusted under 35 U.S.C. 154(b) by 828 days.

(21) Appl. No.: 11/415,562

(22) Filed: May 2, 2006

(65) Prior Publication Data
US 2007/0260536 A1 Nov. 8, 2007

(51) Int. Cl.
*G06Q 40/00* (2006.01)

(52) U.S. Cl. ............... 705/45; 705/67; 705/78; 705/43; 235/379

(58) Field of Classification Search ............ 705/45, 705/39; 345/557; 382/138; 235/379
See application file for complete search history.

(56) References Cited

U.S. PATENT DOCUMENTS

| | | | |
|---|---|---|---|
| 5,206,803 A | | 4/1993 | Vitagliano et al. |
| 5,504,677 A | * | 4/1996 | Pollin ............................... 705/45 |
| 5,677,955 A | * | 10/1997 | Doggett et al. ................. 705/76 |
| 6,044,362 A | * | 3/2000 | Neely ............................... 705/34 |
| 6,105,007 A | * | 8/2000 | Norris ............................. 705/38 |
| 6,202,051 B1 | * | 3/2001 | Woolston ..................... 705/26.3 |
| 6,618,708 B1 | * | 9/2003 | Sakamoto et al. .............. 705/40 |
| 2002/0065771 A1 | * | 5/2002 | Dutta .............................. 705/40 |
| 2003/0208445 A1 | * | 11/2003 | Compiano ....................... 705/40 |
| 2004/0133516 A1 | | 7/2004 | Buchanan et al. |
| 2005/0161502 A1 | * | 7/2005 | Smith et al. ................... 235/379 |
| 2005/0171798 A1 | | 8/2005 | Croft |
| 2007/0198403 A1 | * | 8/2007 | Aloni et al. ...................... 705/39 |

OTHER PUBLICATIONS

James McAndrews, The Automated Clearinghouse System: Moving Toward Electronic Payment, Jul./Aug. 1994, Business Review, pp 15-23 (Clearinghouse).*
CyberSource, Chapter 4, http://www.reynj.com/CyberSource_Developer_Guide/html_site_server/ch04.html, Published Jun. 14, 2001 (CC Processing).*
http://money.howstuffworks.com/credit-card.htm.
http://www.nacha.org/About/what_is_ach_.htm.
15 USC 1693(k).
12 CFR 205.10.
Check 21 Resource Document, Mar. 2004.

* cited by examiner

*Primary Examiner* — Kambiz Abdi
*Assistant Examiner* — Chika Ojiaku
(74) *Attorney, Agent, or Firm* — Chason A. Carroll; Philip H. Burrus, IV

(57) ABSTRACT

A system and method for verifying the existence of a deposit account, such as a checking account, are provided. The system and method may also be used to determine whether the deposit account is configured to receive automatic transactions for withdrawal. For example, a lender may extend an offer of credit to a borrower where payments of principal and interest are to be made by automatic withdrawals. Prior to transferring the principal, the lender verifies the existence and configuration of the borrower's deposit account by charging a fee to establish the line of credit and retrieving the fee by automatic withdrawal. Once the transaction clears and the lender receives the fee, the lender is assured that the account does exist and is configured to receive automatic transactions. Two exemplary methods of retrieving the fee are electronic funds transfer and remote creation of a paper negotiable instrument.

18 Claims, 6 Drawing Sheets http://www.creditapplication.com/applynow.html —501  502   506

Credit Apply to receive an unsecured credit card

Guaranteed $300 Unsecured Credit Line!
Apply Today!
[Click to Increase Credit]

Credit
555 123 456
Your Name Here

Applicant Information:

First Name | Middle Initial | Last Name | | 503

Address | City | State | Zip

Home Phone | | E-mail address

Months at Residence: 504
[Choose V]

Social Security Number | Date of Birth | Mother's Maiden Name

Work Phone | Annual Income: | | | 503

How do you receive your income? | How often do you receive your income?
[Choose V] | [Choose V]

Your banking information is required for making minimum payments on your Guaranteed $300 Unsecured Gold Credit Card Credit Line.

type your ABA or Routing Number
and Checking Account Number.
Use picture as a guide.

505  ABA or Routing Number:

Checking Account Number:

Your Name      1525
15 Your Street
Your town, GA 12345
Pay to the
Order of_____
                                Dollars
Memo_____
123456789   98765432   1525
ABA or Routing / Account / Check
Number       Number    Number      506

Automatic Payment Information:

Credit Unsecured Credit Card takes the worry out of paying your monthly credit card bill. Enrollment in the Credit Unsecured Credit Card Automatic Payment Plan is required for account approval. CLICK HERE to see additional information regarding the automatic payment amount. PLEASE INDICATE HOW YOU WOULD LIKE TO MAKE YOUR AUTOMATIC PAYMENTS BY SELECTING ONE OF THE OPTIONS BELOW: 507

● By selecting the EFT option, you elect to have your payments made by electronic funds transfer ("EFT"). An EFT is a convenient, paperless electronic transfer of funds from your checking account.  508

● By selecting the RCC option, you elect to have your payments made by remote check creation ("RCC") and authorize the bank to create paper drafts on your behalf to withdraw funds from your checking account. *You understand that by selecting this RCC option, you are choosing to pay higher account fees to cover the additional costs of handling and processing RCC payments.*

I would like to choose: [Choose V]
                                      509
510  Details of Offer and Applicant Statement
             [Ts & Cs]

You are applying for a Guaranteed $300 Unsecured Credt Card Credit Line, and by clicking the "Apply Now" button below, you agree to the "Details of Offer" and the "Applicant Statement" presented above.  511

[APPLY NOW!]

*FIG. 5*

METHOD AND SYSTEM FOR ACCOUNT VERIFICATION

BACKGROUND

1. Technical Field

This invention relates generally a method and system for verifying the configuration of a financial account, and more specifically to a method and system for verifying that an account exists, along with verifying that a positive balance is present in the account, and that the account is configured to be compatible with automatic transactions.

2. Background Art

With the advent of technology, transactions involving an exchange of money are becoming faster and faster. Not too long ago, the process of paying the telephone bill was time consuming and involved a lot of paper. For instance, a person might first receive a physical paycheck from his employer. He would then physically go to the bank, to deposit the paycheck in his checking account. Once the physical paycheck proceeded through the check clearing system, the funds would be credited to the person's account. With the funds securely in his checking account, the person would then physically write a check to the telephone company and mail it. The telephone company would then physically go to the bank, deposit the check and so forth. The entire process may take ten days or more to complete.

With new technologies, this "revenue cycle" may be reduced to a day or two. For example, commonly assigned, copending U.S. patent application Ser. No. 11/415,645, entitled "Method and System for Extending Credit with Automated Repayment", teaches a system and method with which a lender may extend a line of credit to a borrower wherein payments of principal and interest are made by recurring automatic withdrawals. With such a system, the borrower is relieved of having to remember to send in payments as the creditor—with the borrower's permission—automatically withdraws payments at periodic intervals.

With such a line of credit, the lender may not receive a physical check from the borrower. Instead, the lender receives perhaps a routing number for the borrower's financial institution and a bank account number. With these numbers, the lender is able to execute the recurring automatic withdrawals, but only if the account is configured to receive such transactions. To be successful in completing the recurring automatic withdrawals, the lender needs a way to verify that an account corresponding to the borrower's information is in existence, and that it is configured to receive such transactions. One method of verifying these elements is to physically telephone the borrower's financial institution to confirm that the account and routing numbers are accurate, and to determine the configuration of the account. There are two problems with this method, however. First, the borrower must provide additional information to the lender, including financial institution telephone number, address, correspondence contact, etc. Second, the process of physically calling each financial institution of each applicant is burdensomely time consuming and cost prohibitive.

There is thus a need for an improved method and system for determining the existence or configuration of a financial account.

BRIEF DESCRIPTION OF THE DRAWINGS

The accompanying figures, where like reference numerals refer to identical or functionally similar elements throughout the separate views, serve to further illustrate various embodiments and to explain various principles and advantages all in accordance with the present invention.

FIG. 5 illustrates one embodiment of a web page for extending an offer of credit with a method of account verification in accordance with the invention.

Figure 1:
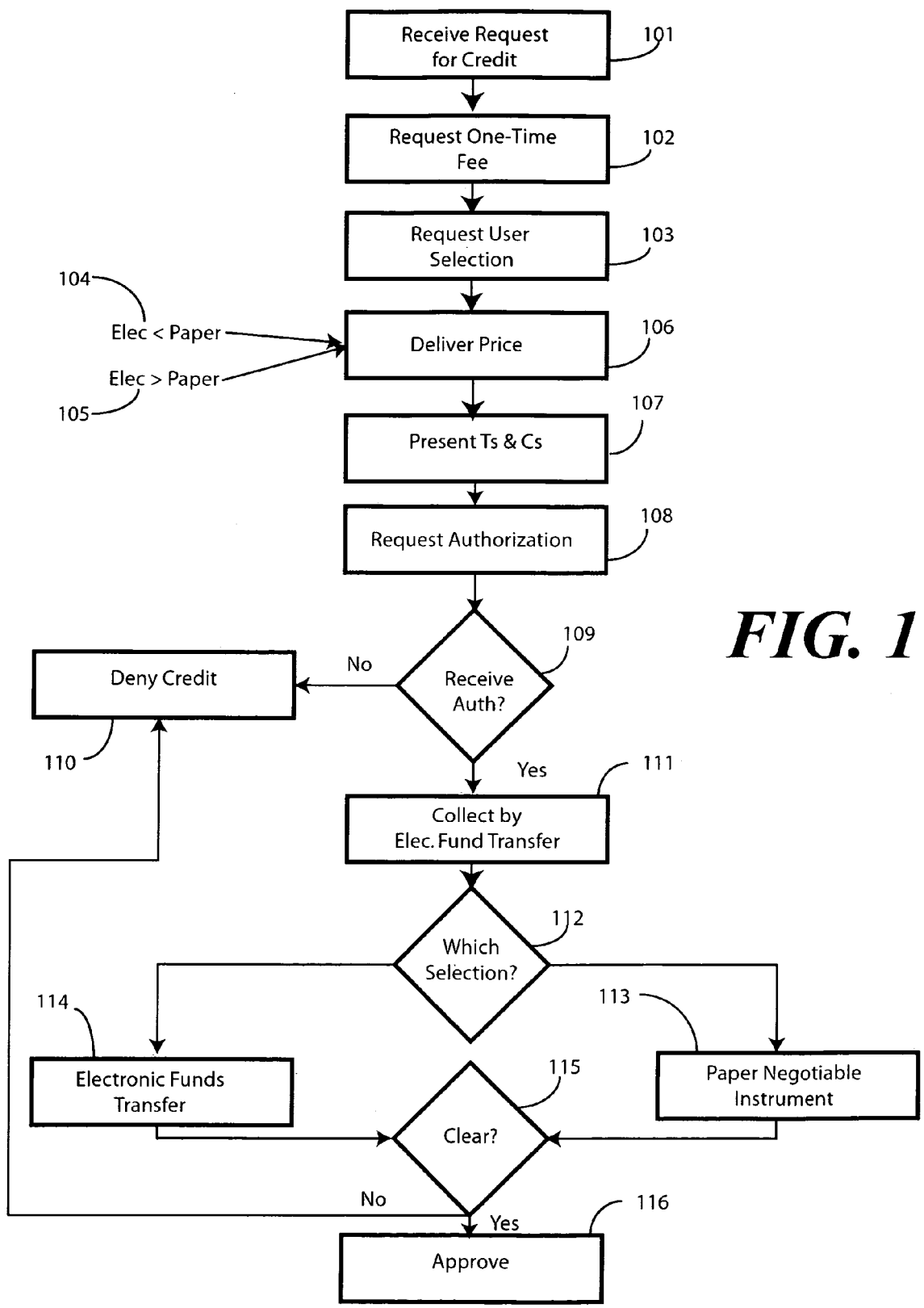
FIG. 1 illustrates one embodiment of a method for verifying the existence of a financial account in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to verifying the existence of a financial account, as well as verifying a positive balance and whether the account is configured to receive automatic transactions. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of verifying the existence or configuration of a financial account as described herein. As such, these functions may be interpreted as steps of a method to perform account verification and configuration. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuits with minimal experimentation.

Embodiments of the invention are now described in detail. Referring to the drawings, like numbers indicate like parts throughout the views. In this document, relational terms such as first and second, top and bottom, and the like may be used solely to distinguish one entity or action from another entity or action without necessarily requiring or implying any actual such relationship or order between such entities or actions. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, reference designators shown herein in parenthesis indicate components shown in a figure other than the one in discussion. For example, talking about a device (10) while discussing figure A would refer to an element, 10, shown in figure other than figure A.

The present invention provides a payee the ability to determine whether a deposit account, for example a checking account, exists and whether the account is configured to receive automatic transactions. For example, where a borrower obtains a line of credit, where payments of principal and interest are to be made by recurring automatic withdrawals, the lender may employ the method and system to determine that the borrower's deposit account exists. Further, the lender may determine that there is a positive balance in the account, and that the account is configured to receive automatic withdrawals.

With the extension of a financial offer, be it a line of credit or other offer, an offeror often charges a fee. This fee may be a nominal amount, perhaps a few dollars to cover establishment of the line of credit or overhead associated with the credit offer. Alternatively, the fee may be more substantial, perhaps a minimum deposit to open a particular type of account.

In response to the offer, a recipient of the offer provides a deposit account number. The recipient may also provide an American Banker's Association (ABA) routing number. The recipient further provides an authorization to execute the fee by way of an automatic withdrawal process.

The offeror then executes the automatic withdrawal using the account and routing information provided by the recipient. The offeror withholds final approval of the offer until the automatic withdrawal is complete and the funds for the one-time fee have been transferred from the recipient's deposit account to the offeror's account. Once this is complete, the offeror completes the extension of the offer.

In one embodiment, the account verification of the present invention is used in conjunction with an extension of credit offer, where payments of principal and interest are to be made by recurring automatic withdrawals. In such an embodiment, the lender is able to use the invention to determine that a borrower's deposit account—a checking account for example—exists and is capable of receiving automatic withdrawal transactions. For discussion purposes, this extension of credit offer will be used to illustrate the present invention. It will be clear to those of ordinary skill in the art having the benefit of this disclosure, however, that the invention is not so limited. The account verification method and system could be used in other contexts, including with the extension of other, non-credit, financial offers.

Turning now to FIG. 1, illustrated therein is one method for determining the existence of a deposit account, and whether the deposit account is configured to accept automatic transactions in accordance with the invention. The transactions are "automatic" in that they occur without the borrower having to initiate the transaction. In other words, in the case of withdrawals, the withdrawals are "pulled" by the lender per the one-time consent, as opposed to being pushed by lender action, such as writing a check each month.

At step 101, an exemplary lender may receive a request for a line of credit. While the method of FIG. 1 is suitable for determining the existence and configuration of an account where the payments of principal and interest will be paid by conventional check, the invention is particularly well suited for extensions of credit that are to be repaid by recurring automatic withdrawals, such as those recited in commonly assigned, copending U.S. patent application Ser. No. 11/415,645, entitled "Method and System for Extending Credit with Automated Repayment", which is incorporated herein by reference. Thus, in one embodiment, at step 101 the lender receives a request from a borrower for a line of credit wherein payments on the line of credit are to be paid by recurring automatic withdrawals. In the copending application, the offer for credit includes extending a firm offer of credit contingent upon obtaining a one-time authorization to execute recurring automatic withdrawals from the deposit account.

At step 102, the lender requests a fee to establish the line of credit. As the payments on the line of credit are to be paid by automatic withdrawals from a deposit account belonging to the borrower, in one embodiment the fee is to be drawn from the borrower's deposit account by way of an automatic withdrawal.

In one embodiment of the invention, the mechanism by which the automatic withdrawals are to be made is user selectable. The lender requests the selection at step 103. For example, a borrower may be able to select from a plurality of options. One such option is by electronic funds transfer. One form of electronic funds transfer is by way of initiating a withdrawal entry from the deposit account in an Automated Clearing House Network. The Automated Clearing House Network is a batch-oriented, electronic funds transfer system that is governed by the National Automated Clearing House Association (NACHA) operating rules. These rules set forth an interbank electronic payment and clearing system for participating depository financial institutions. The Federal Reserve Bank and others, like the Electronic Payments Network for instance, serve as Automated Clearing House operators. These operators serve as central clearing facilities through which participating institutions may transmit and receive Automated Clearing House entries. The various forms of Automated Clearing House transactions include direct deposit transactions, consumer bill transactions, business-to-business transactions, and government transactions.

Any individual, corporation, or other entity that initiates an entry into the Automated Clearing House network, be it a deposit (credit) entry or a withdrawal (debit) entry, is considered to be an originator. Any participating financial institution that originates Automated Clearing House entries at the request of a customer is considered to be an originating depository financial institution. Any participating financial institution that is qualified to receive Automated Clearing House entries is considered to be a receiving depository financial institution. Any individual, corporation, or other entity that authorizes an originator to initiate a credit or debit entry to a transaction account that is held in the custody of a receiving depository financial institution is considered to be a receiver.

Thus, in one embodiment of the invention the fee to establish the line of credit may be executed by initiating a withdrawal entry into the Automated Clearing House network. For instance, a lender may charge ten dollars to establish the line of credit. The lender may therefore initiate a withdrawal entry into the Automated Clearing House network from the checking account of the borrower for the ten-dollar fee. If the transaction clears, the lender knows that the account is both valid and configured to receive Automated Clearing House network transactions. In such a scenario, a receiving depository financial institution holds the deposit account, as the checking account is held in custody by the lender's financial institution. The borrower, providing the authorization for the lender to execute the Automated Clearing House transaction for the fee, becomes the receiver. The lender, who executes the Automated Clearing House transaction for the fee, is the originator. Depending upon the entity, the lender may be the originating depository financial institution and the originator. Otherwise, the lender may have an originating depository financial institution execute the withdrawal entry on its behalf.

Figure 2:
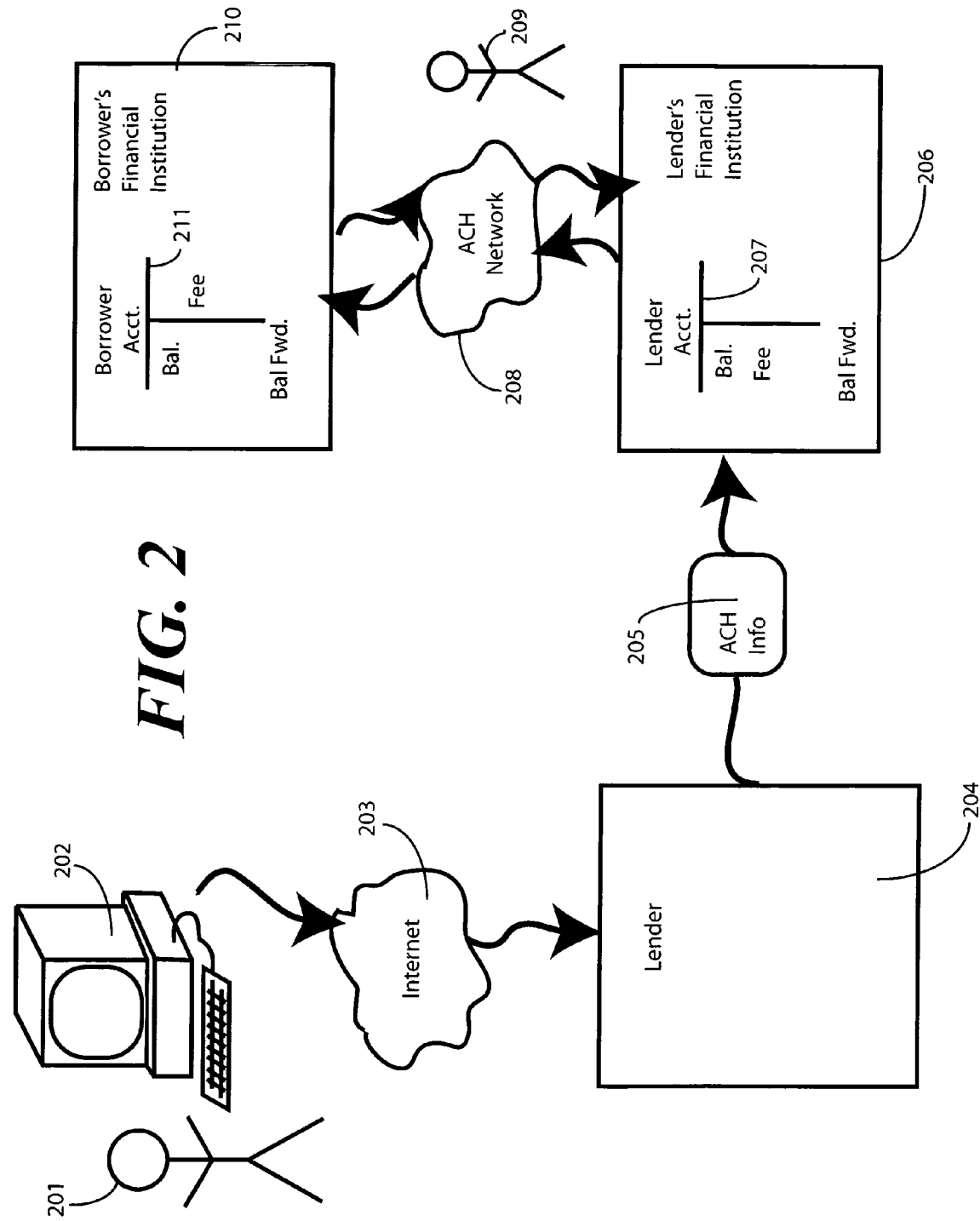
FIG. 2 illustrates one method of accomplishing an automatic fund transfer in accordance with the invention.

Turning briefly to FIG. 2, illustrated therein is an outline of an Automated Clearing House transaction. A borrower 201, perhaps by way of a computer 202 coupled to the lender 204 by a network like the Internet 203, sends the Automated Clearing House payment information and an authorization to the lender 204. The lender then submits this information 205 to its bank or other financial institution 206. The financial institution 206 then routes the transaction to the Automated Clearing House Network 208, and to an Automated Clearing House operator 209. The Automated Clearing House operator 209 then routes the transaction to the borrower's financial institution 210, which is the receiving financial institution. Funds are made available to the lender, and the borrower's deposit account 211 is debited. The Automated Clearing House operator 209 settles the transactions between the participating financial institutions 206,210. Final settlement occurs when the lender's account 207 credited and a confirmation is sent to the lender.

Turning back to FIG. 1, electronic funds transfer is but one of the options from which a borrower may select. A second option is by creation and execution of a paper negotiable instrument. One such example of the creation and execution of a paper negotiable instrument is a remote check creation process. In a remote check creation process, the borrower provides a financial institution account number and a routing number. The lender then, remotely, creates a paper check with the financial institution account number, routing number, and amount printed thereon. While this remotely created check may then be circulated through the banking system, thereby making the remote check creation a paper process, more often a hybrid process is used. In the paper/electronic hybrid process, the lender scans the check to create a "substitute check" under the Check Clearing for the 21st Century Act, and routes the substitute check electronically to execute the withdrawal from the borrower's checking account.

Figure 3:
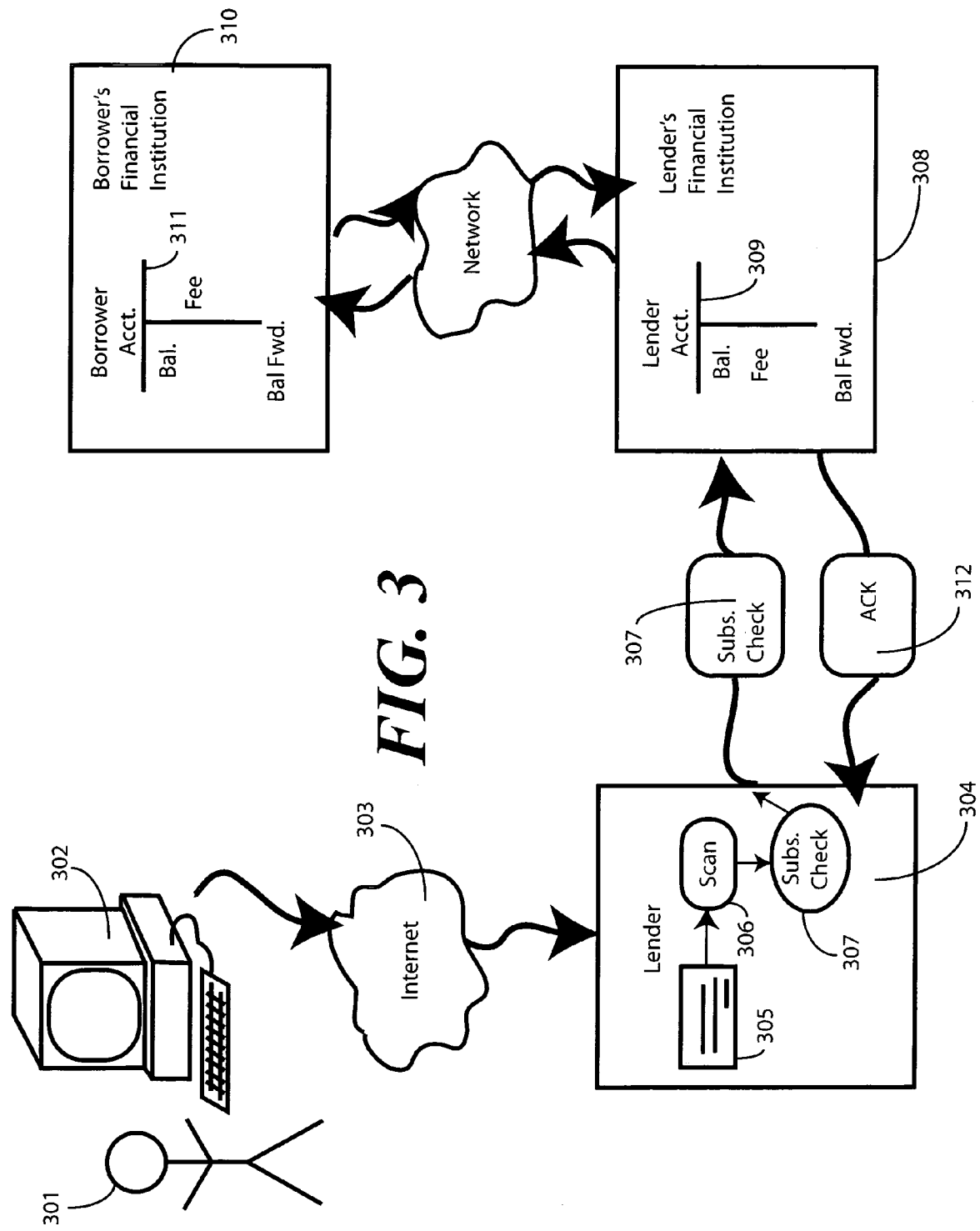
FIG. 3 illustrates one method of accomplishing a remote check creation automatic fund transfer in accordance with the invention.

Turning briefly to FIG. 3, illustrated therein is an outline of a hybrid remote check creation process. A borrower 301, perhaps by way of a computer 302 coupled to the lender 304 by a network like the Internet 303, sends an account number and routing number to the lender 304. The lender 304 then remotely creates a paper check 305, having a MICR line just as would a personal check written and signed by the borrower 301. The paper check 305 is then immediately scanned 306 and converted into a "substitute check" 307 in accordance with the Check Clearing for the 21st Century Act. This substitute check 307 is then transmitted electronically to the lender's financial institution 308 for deposit. The lender's financial institution 308 preliminarily credits the lender's account 309 and electronically routes the substitute check 307 to the borrower's financial institution 310. The borrower's financial institution 310 then debits the borrower account 311 and completes the routing of the substitute check 307. A confirmation 312 is then delivered to the lender 304.

It will be clear to those of ordinary skill in the art having the benefit of this disclosure that the automatic execution of withdrawals of the fee are not limited to only withdrawal entries in an Automated Clearing House network and remote check creation processes. Other electronic transfer mechanisms may also suffice. For instance, Visa® has recently announced an electronic funds transfer mechanism know as the Visa® POS check service. Similar to remote check creation, the Visa® POS check service converts actual checks tendered at a point of sale into electronic transactions. Thus, in one embodiment of the invention, one option for executing the transaction to withdraw the fee is by converting a paper check at a point of sale into an electronic debit. Other electronic techniques may be substituted as well.

Turning back to FIG. 1, at step 103 the borrower is asked which method he would prefer. Of the options mentioned above, generally speaking the withdrawal entry into the Automated Clearing House network is the most cost effective. According to the U.S. Treasury Department, an electronic funds transfer like those through the Automated Clearing House network is less expensive than paper check payments and collections. According to Treasury Department data, it costs the U.S. government eighty-three cents to issue a paper check, while it costs only eight cents to make a payment by way of the Automated Clearing House network.

For this and other reasons, a lender extending an offer of credit in accordance with the invention may elect to price the fee for establishing the line of credit with the various withdrawal options differently. Thus, at optional step 106, the price associated with each particular option is presented to the customer. The automatic withdrawal of the fee to establish the line of credit executed by an electronic funds transfer, like a withdrawal entry into the Automated Clearing House network, may be offered at a first price, while withdrawal of the fee to establish the line of credit executed by remote creation of a paper negotiable instrument may be offered at a second price. Where the lender wants, for example, to encourage customers to select the electronic funds transfer option, the price associated with this transfer may be less than for the remote creation of the paper negotiable instruments as is shown at 104. The opposite may also be true: the electronic funds transfer option may be offered at a higher price than the creation of paper negotiable instruments, as is shown at 105. The prices of each are presented at step 106.

Once the selection is made, the lender may elect to present terms and conditions to the borrower at step 107. The terms and conditions may include details of the credit offer, timing of the withdrawal for the fee to establish the line of credit, and timing of approval or denial of the credit line. Further, the terms and conditions may include language required by regulation, such as the election of the electronic funds transfer is not a requirement of the extension of credit may be included. The terms and conditions may also include a notice that the deposit account of the borrower will be debited for the fee by an automatic withdrawal.

The authorization to execute the automatic withdrawal for the fee is requested at step 108. The request may include a request for the routing number of the borrower's deposit account, as well as an identification number for the borrower's deposit account. In such a case, the authorization would include this information, thereby enabling the lender to obtain both. Receipt of the authorization to execute the automatic withdrawal is verified at decision 109.

Where the authorization is not given, the prospective borrower may be denied credit at step 110. Where the authorization is given, the lender executes an automatic withdrawal from the deposit account for the fee. In one embodiment, this automatic withdrawal is either an electronic funds transfer 114 or a remote creation of a paper negotiable instrument 113, the selection of which is made at decision 112 and corresponds to the user selection received at 109. Once the automatic withdrawal clears, as determined at decision 115, the lender may complete the approval process at step 116.

Approval of the line of credit may be withheld until the automatic withdrawal from the deposit account for the fee is completed. Note that this withholding of approval may be accomplished in several ways. In a first embodiment, the withholding of approval includes delaying establishment of an account or line of credit until the automatic withdrawal from the deposit account for the fee is completed.

In another embodiment, where extension of the line of credit is to be made by providing the borrower with a credit or debit card, withholding approval may include establishment of an account and provision of the line of credit card to the borrower while prohibiting transaction processing until the automatic withdrawal from the deposit account for the fee is completed. Thus, the borrower would have a card and an account, but would be unable to execute charges until the automatic withdrawal from the deposit account for the fee is completed. In another embodiment, the withholding approval includes prohibiting establishment of a line of credit account until the automatic withdrawal from the deposit account for the fee is completed.

Waiting for completion of the automatic withdrawal from the deposit account may also include a post completion wait time. Due to the regulations and procedures in place with some financial institutions, the lender may desire to wait a sufficient amount of time after the withdrawal execution to ensure that the withdrawal is not denied, returned, or rejected. Thus the step of withholding approval until the withdrawal is complete may also include a waiting time, for example four to six days, to ensure that the withdrawal is not returned. In such an embodiment, both the withdrawal execution and expiration of the wait time must occur for approval.

Figure 4:
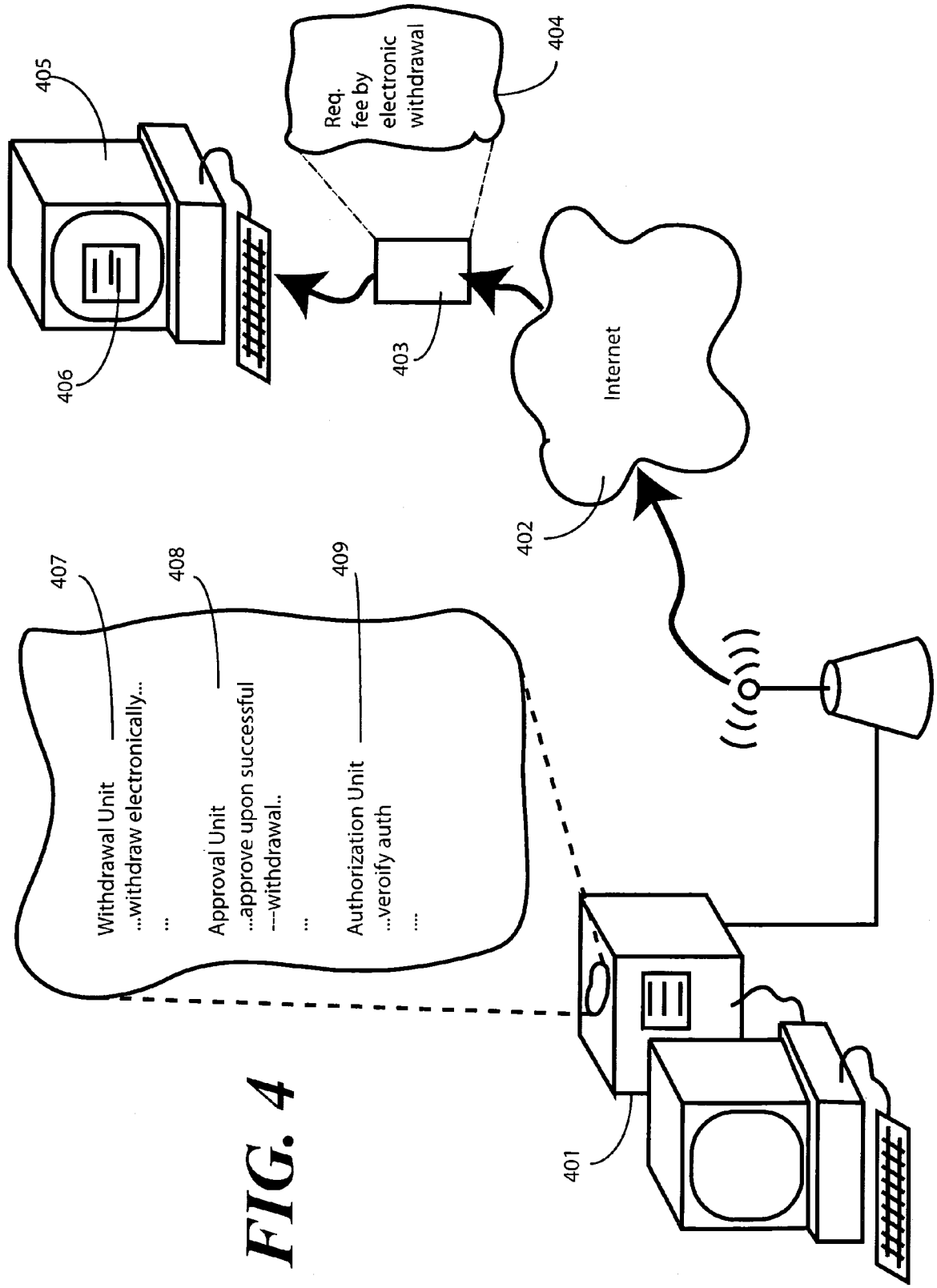
FIG. 4 illustrates one embodiment of a system for verifying the existence of a financial account in accordance with the invention.

Turning now to FIG. 4, illustrated therein is one embodiment of a system for determining whether a deposit account is configured to accept automatic transactions in accordance with the invention. A network information server 401 is configured to deliver browser readable content 403 to a client terminal 405 having a browser 406 in communication with the Internet 402. The network information server 401 includes interactive web pages that facilitate a firm offer for an extension of credit application. With the credit application content, a borrower may submit a request for a line of credit. In one embodiment, the offer is contingent upon a borrower providing a one-time authorization for the lender to execute recurring automatic withdrawals from a deposit account by selecting from a plurality of recurring automatic repayment options. The credit application content also includes a user selectable authorization for a lender to charge a fee for establishing the line of credit. The fee is to be automatically withdrawn from the borrower's deposit account.

A prospective borrower may access the credit application content 404 through the client terminal 405 by connecting to a network such as the Internet 402 and entering a Uniform Resource Locator (URL) address. The borrower may then enter the necessary information, which may include name, address, social security number, financial institution account number, ABA routing number, and so forth, thereby completing the extension of credit application content. The prospective borrower may then select from the plurality of automatic withdrawal payment options, one of which may be by way of electronic funds transfer.

A withdrawal unit 407 is operable with the network information server 401 and is configured to execute the automatic withdrawal from the deposit account for the fee. As noted above, the withdrawal unit 407 may execute this automatic withdrawal in a number of ways, including electronic funds transfer and remote creation of a paper negotiable instrument.

Where execution of the automatic withdrawal is unsuccessful, the withdrawal unit 407 may repeat the attempted automatic withdrawal for a predetermined number of times. For example, some jurisdictions limit such attempts to three or less.

An approval unit 408 is operable with the withdrawal unit 407 and is configured to withhold approval of the line of credit until the automatic withdrawal being executed by the withdrawal unit 407 is complete. Where the predetermined number of automatic withdrawals attempts is exhausted and has proven unsuccessful, the approval unit 408 may withhold approval of the line of credit until the borrower reauthorizes the withdrawal unit 407 to make additional attempts. As noted above, withholding approval can take various forms. In one embodiment, where extension of the line of credit is to be made by providing the borrower with a credit or debit card, withholding approval may include establishment of an account and provision of the line of credit card to the borrower while prohibiting transaction processing until the automatic withdrawal from the deposit account for the fee is completed. Thus, the borrower would have a card and an account, but would be unable to execute charges the until automatic withdrawal from the deposit account for the fee is completed. In another embodiment, the withholding approval includes prohibiting establishment of a line of credit account until the automatic withdrawal from the deposit account for the fee is completed. An optional authorization unit 409 is operable with the approval unit 408, and is configured to authorize the line of credit only where an authorization to execute recurring automatic withdrawals from the deposit account is received from the network information server 401.

Turning now to FIG. 5, illustrated therein is one embodiment of credit application content 403 in accordance with the invention. The credit application content takes the form of a webpage viewable by a client terminal having a browser 506 in communication with the Internet or similar network.

A prospective borrower accesses the webpage 403 by typing a URL 501 in the browser's URL window 502. The webpage 403 includes the credit application content that a borrower may complete with a terminal keyboard. For example, the borrower may enter personal information 503, including name, address, phone number and e-mail address. The borrower may then enter financial information 504, including social security number, annual income, and method of receiving income.

As one embodiment of the invention includes an offer of credit contingent upon the lender being able to execute an automatic withdrawal from a deposit account for the fee to establish the account, the borrower may give checking account information, including ABA routing number and checking account number, in section 505 of the webpage 403. A statement of the contingency details may be provided to notify the borrower that the credit line will be declined without such automatic withdrawal access.

Optional modes for the automatic withdrawal of the fee, from which the borrower may select, may be provided. For example, mode 507 includes automatic withdrawal by way of electronic funds transfer. Mode 508 includes automatic withdrawal by way of remote check creation. The borrower may select one mode with a selection prompt 509.

Terms and conditions of the offer for credit may then be presented to the borrower at block 510. In one embodiment, the terms and conditions include information about the fee charged to establish the line of credit. Exemplary terms and conditions may read as follows: "By clicking the 'Apply Now' button below, you authorize [lender] to immediately deduct the one-time processing fee from your checking account if you are approved for a [line of credit]."

Once the terms and conditions are read and understood, the user may apply for the line of credit by clicking icon 511. Where the lender is able to execute the automatic withdrawal for the fee to establish the line of credit, and the borrower meets certain other criteria, the lender may approve the application.

Figure 6:
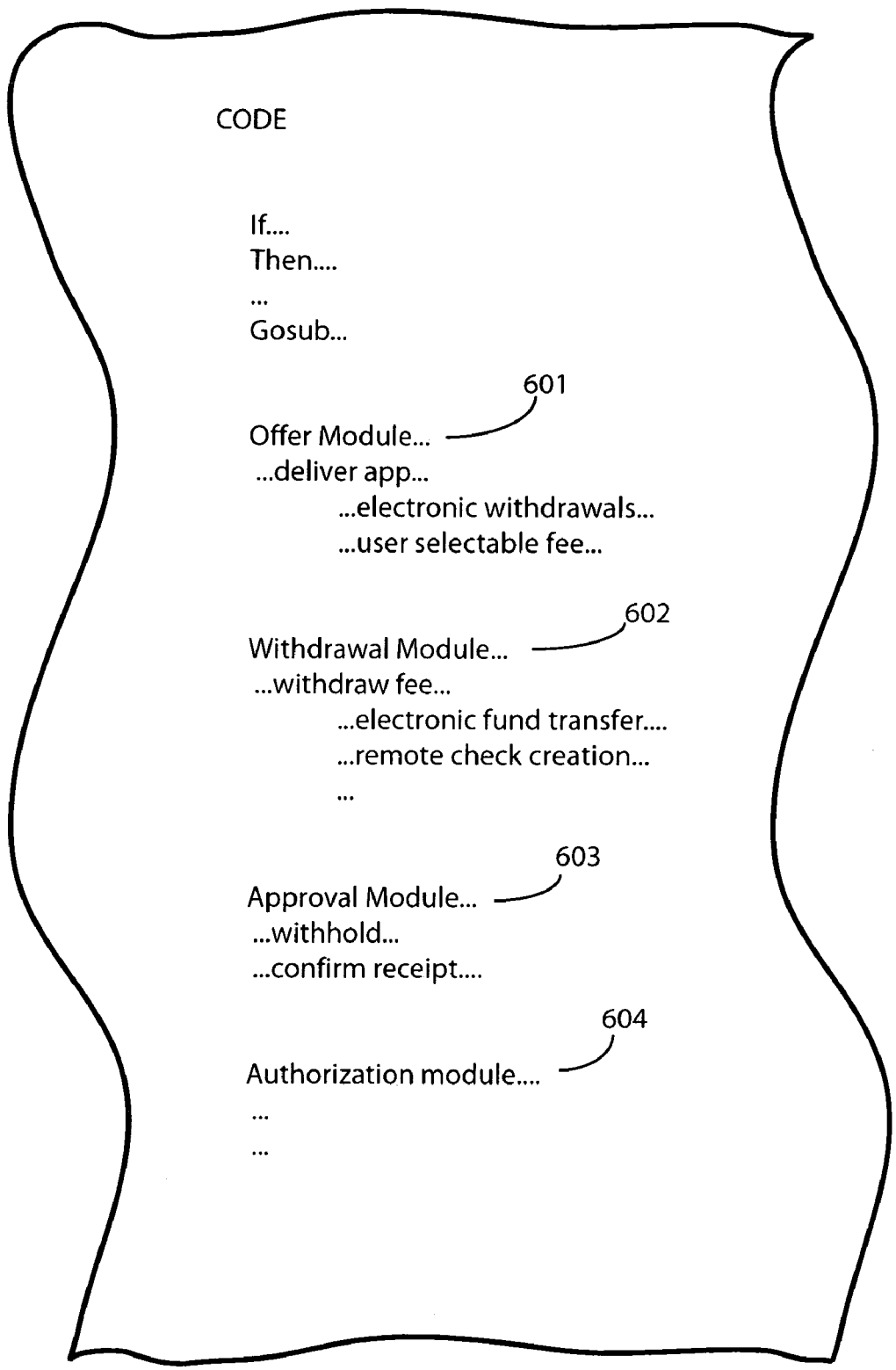
FIG. 6 illustrates a top-level diagram of executable software commands for verifying the existence of an account in accordance with the invention.

Turning now to FIG. 6, illustrated therein is a top-level diagram of computer usable code having embodied therein instructions for determining whether a deposit account is configured to accept automatic transactions in accordance with the invention. An offer module 601 is configured to deliver a line of credit application that includes at least an authorization for payments to be made by recurring automatic withdrawals. The offer module 601 further delivers a user selectable authorization for a fee to establish the line of credit. In one embodiment, the fee is to be automatically withdrawn from a borrower's deposit account.

A withdrawal module 602 is configured to automatically withdraw the fee from the deposit account. The automatic withdrawal may take one of several forms. In one embodiment, the automatic withdrawal is by electronic funds transfer. In another embodiment, the automatic withdrawal is by remote creation of a paper negotiable instrument.

An approval module 603 is configured to withhold approval of the credit line until the automatic withdrawal from the deposit account for the fee is complete. In so doing, the a lender executing the computer readable code is assured that the account in question is configured to receive automatic transactions prior to transferring principal associated with the line of credit. In embodiments where the line of credit is contingent upon receiving an authorization to execute recurring automatic withdrawals, an optional authorization module 604 is configured to authorize the line of credit only where authorization to execute the recurring automatic withdrawals from the deposit account is received from the borrower.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method, operable with a computer, for determining whether a deposit account is configured to accept automatic transactions, the method comprising:
   receiving a request for a line of credit, wherein payments on the line of credit are to be paid by recurring automatic withdrawals;
   requesting a fee to establish the line of credit, wherein the fee is to be drawn from the deposit account;
   verifying existence and configuration of the deposit account, including whether the deposit account is configured to accept the automatic transactions by executing an automatic withdrawal from the deposit account for the fee, wherein the automatic withdrawal comprises an electronic funds transfer;
   withholding, by an approval unit, approval of the line of credit until the automatic withdrawal from the deposit account for the fee is completed, wherein the step of withholding approval comprises providing a credit card associated with the potential line of credit to be approved and prohibiting transaction processing of the provided credit card until the automatic withdrawal from the deposit account for the fee is completed; and
   where the existence of the deposit account is verified by executing the automatic withdrawal from the deposit account for the fee, wherein the line of credit associated with the provided credit card is approved.

2. The method of claim 1, wherein withholding approval comprises prohibiting establishment of a line of credit account until the automatic withdrawal from the deposit account for the fee is completed.

3. The method of claim 1, wherein the automatic withdrawal from the deposit account for the fee comprises a withdrawal entry in an automated clearing house network.

4. The method of claim 3, wherein the deposit account is held by a receiving depository financial institution.

5. The method of claim 4, wherein the withdrawal entry is executed by an originating depository financial institution.

6. The method of claim 1, wherein a mode for executing the automatic withdrawal from the deposit account for the fee is user selectable and comprises optional modes.

7. The method of claim 6, wherein the fee is less when the user selection comprises the electronic funds transfer than when the user selection comprises other optional modes.

8. The method of claim 1, further comprising delivering terms and conditions associated with the automatic withdrawal, wherein the terms and conditions comprise a notice that the deposit account will be debited for the fee.

9. The method of claim 1, wherein the request for credit comprises credit contingent upon obtaining a one-time authorization to execute the recurring automatic withdrawals from the deposit account, wherein the one-time authorization comprises a selection from a plurality of repayment options, wherein at least one of the plurality of repayment options comprises a withdrawal executed by electronic funds transfer.

10. The method of claim 1, further comprising:
   obtaining a routing number for the deposit account;
   obtaining an identification number for the deposit account; and
   obtaining a one-time authorization to execute the recurring automatic withdrawals from the deposit account, wherein the one-time authorization comprises a selection from a plurality of repayment options, wherein at least one of the plurality of repayment options comprises a withdrawal executed by remote electronic funds transfer.

11. A system for determining whether a deposit account is configured to accept automatic transactions, the system comprising:
   a. a network information computer configured to deliver browser readable content to a client terminal having a browser in communication with the Internet, the network information computer providing at least credit application content to the browser with which an applicant may submit a request for a line of credit, wherein the credit application content comprises an authorization for payments to be paid by recurring automatic withdrawals from the deposit account, further wherein the credit application content comprises a user selectable authorization for a fee to establish the line of credit, wherein the fee is to be automatically withdrawn from the deposit account;

b. a withdrawal unit operable with the network information computer, the withdrawal unit being configured to verify whether the deposit account is configured to accept the automatic transactions by executing an automatic withdrawal from the deposit account for the fee, wherein the automatic withdrawal comprises one of an electronic funds transfer or a creation of a paper negotiable instrument; and c. an approval unit operable with the withdrawal unit, wherein the approval unit is configured to withhold approval of the line of credit until the automatic withdrawal from the deposit account for the fee is completed, wherein withholding approval comprises providing a credit card associated with the potential line of credit to be approved and prohibiting transaction processing of the provided credit card until the automatic withdrawal from the deposit account for the fee is completed and wherein the line of credit associated with the provided credit card is approved where verification that the deposit account is configured to accept the automatic transactions occurs by executing the automatic withdrawal from the deposit account for the fee.

12. The system of claim 11, wherein the automatic withdrawal comprises a withdrawal entry in an automated clearing house network.

13. The system of claim 11, wherein the automatic withdrawal comprises remote creation of a paper negotiable instrument.

14. The system of claim 11, further comprising an authorization unit operable with the approval unit, wherein the authorization unit if configured to authorize the line of credit only where an authorization to execute recurring automatic withdrawals from the deposit account is received from the network information computer.

15. A non-transitory computer readable medium having embodied therein instructions for causing the one or more processors to determine whether a deposit account is configured to accept automatic transactions, the computer readable medium comprising:

an offer module configured to deliver a line of credit application comprising an authorization for payments to be paid by recurring automatic withdrawals from the deposit account, the line of credit application further comprising a user selectable authorization for a fee to establish the line of credit, wherein the fee is to be automatically withdrawn from the deposit account;

a withdrawal module configured to verify whether the deposit account is configured to accept the automatic transactions by automatically withdrawing the fee from the deposit account by one of an electronic funds transfer or a remotely created paper negotiable instrument; and an approval module configured to withhold approval of the line of credit until the automatic withdrawal from the deposit account is completed wherein withholding approval comprises providing a credit card associated with the potential line of credit and prohibiting transaction processing of the provided credit card until the automatic withdrawal from the deposit account for the fee is completed wherein the line of credit associated with the provided credit card is approved where the deposit account is configured to accept the automatic transactions by withdrawing the fee from the deposit account.

16. The non-transitory computer readable medium of claim 15, wherein the automatic withdrawal comprises a withdrawal entry in an automated clearing house network.

17. The non-transitory computer readable medium of claim 15, wherein the automatic withdrawal comprises remote creation of a paper negotiable instrument.

18. The non-transitory computer readable medium of claim 15, further comprising an authorization module configured to authorize the line of credit only where an authorization to execute recurring automatic withdrawals from the deposit account is received.

* * * * *